United States Patent [19]

Forss et al.

[11] Patent Number: 4,681,935

[45] Date of Patent: Jul. 21, 1987

[54] PROCEDURE FOR RECOVERING SOLUBLE CARBOHYDRATES CONTAINED IN WOOD

[75] Inventors: Kaj Forss, Helsinki; Matti Sten, Salosaari; Juhani Peltonen, Imatra; Veikko Jokela, Tiurinniemi, all of Finland

[73] Assignee: Enso-Gutzeit Oy, Helsinki, Finland

[21] Appl. No.: 817,838

[22] PCT Filed: Apr. 2, 1985

[86] PCT No.: PCT/FI85/00035

§ 371 Date: Nov. 27, 1985

§ 102(e) Date: Nov. 27, 1985

[87] PCT Pub. No.: WO85/04409

PCT Pub. Date: Oct. 10, 1985

[30] Foreign Application Priority Data

Apr. 2, 1984 [FI] Finland .................................. 841318

[51] Int. Cl.$^4$ .......................... C08B 37/14; D21C 3/02
[52] U.S. Cl. ......................................... 536/56; 127/34; 127/37; 536/57; 162/29; 162/41; 162/42; 162/43; 162/44
[58] Field of Search ...................... 536/56, 57; 162/29, 162/41-44, 82-84, 86, 89, 90; 127/34, 37

[56] References Cited

U.S. PATENT DOCUMENTS

| 3,935,022 | 1/1976 | Sihtola | 536/56 |
| 4,270,914 | 6/1981 | Dahl | 536/56 |
| 4,277,626 | 7/1981 | Forss et al. | 568/438 |
| 4,450,106 | 5/1984 | Forss | 162/72 |

Primary Examiner—Ronald W. Griffin
Attorney, Agent, or Firm—Toren, McGeady & Associates

[57] ABSTRACT

The invention concerns a procedure for recovery of soluble carbohydrates present in wood, in connection with the alkaline cellulose digesting process. According to the invention, recovery of carbohydrates takes place at the initial phase of the cellulose digesting process, where the digesting solution contains dissolved polysaccharides in abundance, while the content of polymeric lignin in the solution is low. A situation like this exists at the stage when the digesting solution has not yet reached the temperature at which the digestion process mainly takes place. As taught by the invention, the carbohydrates are recovered by conducting digesting solution to an ultrafilter, which separates the carbohydrates therefrom, and by returning the filtered solution to the cellulose digestion. The carbohydrates that are obtained may be used e.g. in the manufacturing of sugar alcohols, or as raw materials for biotechnical processes.

7 Claims, 1 Drawing Figure

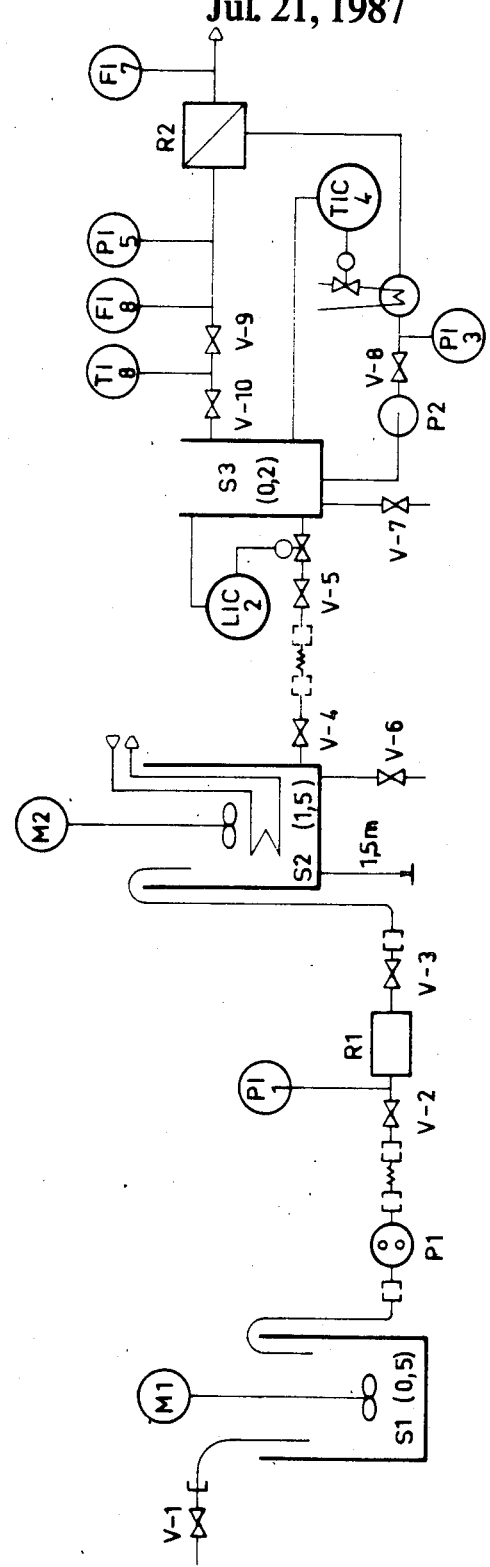

PROCEDURE FOR RECOVERING SOLUBLE CARBOHYDRATES CONTAINED IN WOOD

The present invention concerns a procedure for recovering soluble carbohydrates contained in wood, wherein the carbohydrates contained in wood that is to be digested to cellulose and which shall be recovered are brought into a solution from which they are separated, and wherein the processing of the wood continues thereafter as an alkaline cellulose digesting process.

The object of the invention is to teach a procedure by which it is possible in connection with manufacturing chemical or chemical-mechanical cellulose pulp to separate a remarkable part of those polysaccharides which are dissolved in the digesting liquor and which in conventional sulphate digesting largely undergo cleaving into saccharic acids and other decomposition products during the digesting process, to end up with the waste liquor in combustion in the digesting chemicals recovery process. The carbohydrates which are solved from the wood or other raw material containing lignocellulose are then recovered in such form that they can be used e.g. in manufacturing monosaccharides or sugar derivatives, as cattle fodder, or for manufacturing alcohol and proteins.

It is previously known that soluble carbohydrates can be manufactured from wood or other lignocellulosic raw materials by hydrolyzing them with a mineral acid, such as dilute or concentrated sulphuric acid or hydrochloric acid. However, these processes have proved uneconomical compared with the producing of cellulose from the raw materials mentioned.

It is also alternatively possible in connection with the manufacturing of cellulose pulp by hydrolyzing wood chips with the aid of steam and mineral acids, in a particular prehydrolysis step prior to the cellulose digesting proper, to produce soluble carbohydrates originating in the hemicelluloses. Depending on hydrolysis conditions, these carbohydrates are more or less completely hydrolyzed, that is, they are in monosaccharide or polysaccharide form. If softwood has been used for wood material, the carbohydrates will contain, among others, glucose, mannose, galactose, xylose and arabinose. If the wood material that has been used is hardwood, the carbohydrates contain mainly xylose.

Hydrolysates of this kind may be used for instance in manufacturing sugar alcohols, such as xylitol or sorbitol, as a raw material in biotechnical processes, for cattle fodder, etc. However, the prehydrolysis procedure is encumbered by the drawback that the yield and quality of cellulose pulp suffer from the hydrolysis and the range of application of this type of pulps is narrow, being primarily restricted to viscose manufacturing.

It is possible to isolate polysaccharides in connection with the mercerizing process included in the manufacturing of viscose fibres. In the mercerizing process, dissolving pulp is treated with NaOH solution, the aim being to dissolve the hemicellulose components from the cellulose. From the solution thus obtained, the solved polysaccharides can be recovered with the aid of ultrafiltration, as these compounds cannot pass through the ultrafiltration membranes and are therefore enriched in the ultrafiltration concentrate. We refer in this context to the U.S. Pat. No. 4,270,914 and to Hurlen, S. Olsen, A.: Removal of Hemicellulose from Steeping Lye by Ultrafiltration. TAPPI/OEZEPA 5th Int. Dissolving Pulps Conf. (Vienna) Papers: 54-58 (Oct. 8-10 1980). The greater part of the polysaccharides originating in the wood have however been dissolved in connection with the cellulose manufacturing process, in the waste liquor, and the polysaccharide quantities obtained in connection with the mercerizing process are therefore minor. It should moreover be kept in mind that the demand of dissolving pulp is limited.

It is known that when cellulose pulp is being manufactured by digesting wood chips or other lignocellulose-containing raw materials by alkaline digesting methods, e.g. by the sulphate process, by soda digesting or by the alkaline sulphite process, part of the polysaccharides present in the raw material (the cellulose and hemicellulose) go into solution in the digesting liquor. At the initial stages of digesting, the hemicelluloses in particular are solved in large quantities in the original polymerized form. It has been shown for instance in S. Axelsson, I. Croon and B. E. Engström, Dissolution of Hemicelluloses During Sulphate Pulping, Svensk Papperstidning 65 (1962); 18, 693–697, that when birch wood was digested by the sulphate method the digesting fluid contained at the beginning of digestion 11 g/l of precipitating polysaccharides. This fraction increases with progressing digestion, and at 150° C. about 8% of the wood could be isolated in the form of polysaccharides. The polysaccharide concentration of the digesting fluid was then about 20 g/l. On continued digestion and with increasing temperature, the polysaccharide fraction was reduced, and the final black liquor contained only about 2 g/l of precipitable polysaccharides. We have now in our own studies observed, additionally, that at the initial stage of digestion less than half of the lignin in the wood has been dissolved mainly in the form of low-molecular derivatives, and therefore, when the polysaccharide content of the digesting liquor is at its highest, the liquor contains hardly any other polymeric compounds.

The above-mentioned observation is the basis of the present invention, which is characterized in that recovery of the soluble carbohydrates in wood is carried out at the initial phase of the cellulose digesting process, at which the polysaccharide content of the digesting solution is high and the content of polymeric lignin is low, by conducting digesting solution into an ultrafilter, which separates therefrom the carbohydrates, and by returning the filtered solution to the cellulose digestion.

Recovery of the carbohydrates takes place, as taught by the invention, most advantageously at the phase when the digesting solution has not yet reached the temperature at which the digesting process mainly takes place. This temperature is usually in the range of 170° to 180° C., and the temperature at which separation of carbohydrates takes place may then be 100°–170° C., preferably 120°–160° C., and most preferably 140°–150° C. In order that reasonable yield might be attained in carbohydrate recovery, at the separation stage at least about 8% of the original dry matter of the wood should be present in the digesting solution in the form of dissolved carbohydrates. In practice, the amount of carbohydrates may vary within the range of 8–30%. Similarly, the quantity of lignin in the digesting solution should be at most 15%, calculated on the original dry matter of the wood, the lignin then occurring in the solution mainly in the form of low-molecular compounds which do not interfere with the polysaccharide separation.

The present invention has the advantage that soluble polysaccharides can be manufactured without any particular prehydrolysis process in connection with manufacturing cellulose pulp. The procedure of the invention is advantageously both technically and economically because no pressure and acid resistant hydrolysis apparatus is required, nor any extra chemicals such as mineral acid, for instance. In view of the environment, it is to be noted that in contrast with the hydrolysis process, in the present process no harmful waste waters or other wastes are produced. Separation of the polysaccharides at the initial stage of digestion is also favourable from the viewpoint of cellulose manufacturing, since their decomposition in connection with cellulose digestion to saccharic acids does not take place without consumption of energy and digesting chemicals.

Removal of the carbohydrates from the digesting solution is also advantageous in view of chemicals regeneration, because part of the soda boiler's capacity is set free, in other words, the cellulose manufacturing capacity may be increased.

In the following, the invention is described by an embodiment example, referring to the attached drawing, which presents an apparatus usable in applying the invention.

EXAMPLE

The object of the experiment that was carried out was by ultrafiltration to separate in industrial conditions xylan from the reflux liquor in birch digestion. The carbohydrate concentration was high at this stage in the digestion, 13.1 g/l, and the lignin content was low according to absorption measurement, $A_{200\,nm} = 410$. The equivalent absorbance value of the digesting liquor at the final stage of digestion would be about 1800, i.e., not more than about 23% of the lignin had been dissolved at this stage.

The ultrafiltration equipment was of type DDS-25-2, 25, with diaphragm area 2.25 m² and diaphragms of type GR8P being used, and this apparatus being surrounded by peripheral apparatus and containers as shown in the drawing.

The reflux liquor was drawn during birch wood digestion from the reflux between the lower end of the absorption tower and the top end of the Kamyr digester, into the container S1.

The container S1 was fitted with mixer and served as chemicals addition vessel. The liquor was pumped from the container S1 by the pump P1 through the pressure filter R1 into the container S2. The pressure filter was type Seitz-Zenith, and filter plates K 150 were being used. The container S2 was likewise fitted with mixer, and from this container the liquor was drawn, through level control, to the supply container S3 of the UF module.

The UF module proper comprised, in addition to the container S3, a circulation pump P2, a heat exchanger and a diaphragm unit R2, from which the concentrate was refluxed to the container S3. The filtrate departed from the system through the rotameter F1-7. The supply pressure of the module during the experiments was 0.8–0.9 MPa and the temperature in the circulation, 80°–86° C. The reflux through the module amounted to 5–8 m³/h. The results are seen in Table 1.

TABLE 1

Separation of carbohydrates from birch sulphate digesting solution.

|  | Volume, l | Dry matter conc., g/l | Dry matter, kg | Carbohydrates.[1] | | |
|---|---|---|---|---|---|---|
|  |  |  |  | g/l | kg | % of dry matter |
| Digesting solution | 190 | 168 | 31.9 | 13.1 | 2.5 | 7.8 |
| Ultrafiltration concentrate | 37 | 224 | 8.3 | 65.9 | 2.4 | 28.9 |
| Ultrafiltration filtrate | 150 | 140 | 21.4 | 1.1 | 0.2 | 0.9 |

[1]The carbohydrate concentration was detemined by liquid chromatography after total hydrolysis (with sulphuric acid).

The table reveals that the volume of the ultrafiltration concentrate containing 96% of the carbohydrates is 19% of the original volume, and it is evident that 76% of the dry matter have been transferred to the ultrafiltration filtrate, containing mainly digesting chemicals which can be returned to the cellulose process.

The composition of the carbohydrates in the ultrafiltration concentrate is given in Table 2.

TABLE 2

Carbohydrate composition of the ultrafiltration concentrate.

| Mannose | 0.2% |
|---|---|
| Glucose | 0.3% |
| Rhamnose | 0.8% |
| Arabinose | 2.4% |
| Galactose | 3.0% |
| Xylose | 93.3% |
|  | 100.0% |

Since the ultrafiltration does not substantially alter the carbohydrate composition (ascertained by measurements), the observation can be made by juxtaposition with the data in Table 1 that by ultrafiltration of the reflux broth in birch digestion the xylose content of the dry matter in the broth could be raised from 7% to 27%, while at the same time the volume of the solution that had to be handled decreased from 190 to 37 liters.

We claim:

1. In a procedure for recovery of soluble carbohydrates present in wood wherein the carbohydrates to be recovered which are contained in wood to be digested to cellulose are brought into a solution from which they are separated, and wherein the treatment of the wood thereafter continues as an alkaline cellulose digestion process, the improvement which comprises performing the recovery of the carbohydrates at the initial phase of the cellulose digesting process, where the polysaccharide content of the digesting solution is high and the content of polymeric lignin is low, by conducting the digesting solution into an ultrafilter which separates the carbohydrates therefrom, and returning the filtered solution to the cellulose digestion and wherein the separation of carbohydrates is carried out before the digesting solution has reached that temperature at which the digesting process mainly takes place.

2. The procedure according to claim 1, wherein the separation of carbohydrates is carried out at that stage when the temperature of the digesting solution is in the interval from 100°–170° C.

3. The procedure of claim 2 wherein the temperature is from 120° to 160° C.

4. The procedure of claim 2 wherein the temperature is from 140° to 150° C.

5. In a procedure for recovery of soluble carbohydrates present in wood wherein the carbohydrates to be recovered which are contained in wood to be digested to cellulose are brought into a solution from which they are separated, and wherein the treatment of the wood thereafter continues as an alkaline cellulose digestion process, the improvement which comprises performing the recovery of the carbohydrates at the initial phase of the cellulose digesting process, where the polysaccharide content of the digesting solution is high and the content of polymeric lignin is low, by conducting the digesting solution into an ultrafilter which separates the carbohydrates therefrom, and returning the filtered solution to the cellulose digestion and wherein the separation of carbohydrates is carried out at a stage at which at least 8% of the original dry matter of the wood are in the solution in the form of dissolved carbohydrates.

6. In a procedure for recovery of soluble carbohydrates present in wood wherein the carbohydrates to be recovered which are contained in wood to be digested to cellulose are brought into a solution from which they are separated, and wherein the treatment of the wood thereafter continues as an alkaline cellulose digestion process, the improvement which comprises performing the recovery of the carbohydrates at the initial phase of the cellulose digesting process, where the polysaccharide content of the digesting solution is high and the content of polymeric lignin is low, by conducting the digesting solution into an ultrafilter which separates the carbohydrates therefrom, and returning the filtered solution to the cellulose digestion, wherein the separation of carbohydrates is carried out before the digesting solution has reached that temperature at which the digesting process mainly takes place and at a stage at which at least 8% of the original dry matter of the wood are in the solution in the form of dissolved carbohydrates.

7. The process of claim 1, 2, 3, 4, 5, or 6, wherein the separation of carbohydrates is carried out at a stage at which the solution contains lignin at most 15%, calculated on the original dry matter quantity of the wood.

* * * * *